United States Patent
Wu

(10) Patent No.: US 10,063,789 B2
(45) Date of Patent: Aug. 28, 2018

(54) ENHANCED BRIGHTNESS IMAGE ACQUISITION DEVICES AND METHODS

(71) Applicant: Yulong Computer Telecommunication Scientific (Shenzhen) Co., Ltd., Shenzhen, Guangdong (CN)

(72) Inventor: Chiqiang Wu, Guangdong (CN)

(73) Assignee: Yulong Computer Telecommunication Scientific (Shenzhen) Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/314,456

(22) PCT Filed: May 29, 2015

(86) PCT No.: PCT/CN2015/080281
§ 371 (c)(1),
(2) Date: Nov. 28, 2016

(87) PCT Pub. No.: WO2015/180686
PCT Pub. Date: Dec. 3, 2015

(65) Prior Publication Data
US 2017/0201692 A1    Jul. 13, 2017

(30) Foreign Application Priority Data
May 29, 2014  (CN) .......................... 2014 1 0234555

(51) Int. Cl.
*H04N 5/225*  (2006.01)
*H04N 5/243*  (2006.01)
(Continued)

(52) U.S. Cl.
CPC ............. *H04N 5/243* (2013.01); *G06T 5/002* (2013.01); *G06T 5/50* (2013.01); *H04N 5/217* (2013.01);
(Continued)

(58) Field of Classification Search
CPC ........................... H04N 5/243; H04N 5/2621
See application file for complete search history.

(56) References Cited

U.S. PATENT DOCUMENTS

2005/0285875 A1*  12/2005  Kang ................... G06T 15/205
                                                   345/629
2007/0153086 A1*  7/2007  Usui ..................... H04N 5/235
                                                   348/153
(Continued)

FOREIGN PATENT DOCUMENTS

CN          200944633 Y    9/2007
CN           1035467 A     1/2014
(Continued)

OTHER PUBLICATIONS

Extended European search report issued in corresponding European application No. 15800509.0 dated Dec. 21, 2017.

*Primary Examiner* — Gary C Vieaux
(74) *Attorney, Agent, or Firm* — Young Basile Hanlon & MacFarlane, P.C.

(57) ABSTRACT

Provided is an image acquisition device, comprising a camera shooting module, wherein the camera shooting module comprises at least two cameras; a control module for controlling the at least two cameras of the camera shooting module to shoot the same scenario; and a processing module for processing images shot by the camera shooting module for the same scenario, so as to obtain images with enhanced brightness. Also correspondingly provided are an image acquisition method and a terminal. The present invention can realize the acquisition of clear images with relatively high brightness in a dark light environment.

17 Claims, 4 Drawing Sheets

(51) Int. Cl.
*H04N 5/217* (2011.01)
*H04N 5/232* (2006.01)
*H04N 5/235* (2006.01)
*H04N 5/262* (2006.01)
*H04N 5/265* (2006.01)
*G06T 5/00* (2006.01)
*G06T 5/50* (2006.01)

(52) U.S. Cl.
CPC ........... *H04N 5/2258* (2013.01); *H04N 5/235* (2013.01); *H04N 5/2351* (2013.01); *H04N 5/23229* (2013.01); *H04N 5/23293* (2013.01); *H04N 5/265* (2013.01); *H04N 5/2621* (2013.01); *H04N 5/2624* (2013.01); *G06T 2207/20221* (2013.01); *H04N 5/2355* (2013.01)

(56) References Cited

U.S. PATENT DOCUMENTS

| | | | |
|---|---|---|---|
| 2009/0009614 A1 | 1/2009 | Kawai | |
| 2011/0205381 A1 | 8/2011 | Vranceanu et al. | |
| 2012/0291172 A1* | 11/2012 | Wills | B23K 9/0956 2/8.2 |
| 2016/0080653 A1* | 3/2016 | Kim | G06T 5/002 348/216.1 |
| 2016/0093034 A1* | 3/2016 | Beck | G06T 5/50 345/617 |
| 2016/0295195 A1* | 10/2016 | Thorn | H04N 5/23219 |

FOREIGN PATENT DOCUMENTS

| | | |
|---|---|---|
| CN | 103986874 A | 8/2014 |
| WO | 2006079963 A | 8/2006 |
| WO | 2008014350 A | 1/2008 |

* cited by examiner

ENHANCED BRIGHTNESS IMAGE ACQUISITION DEVICES AND METHODS

CROSS-REFERENCE TO RELATED APPLICATION(S)

This present application claims the benefit of priority to China Patent Application No. 201410234555.2, filed in Chinese Patent Office on May 29, 2014, and entitled "IMAGE ACQUISITION DEVICE, IMAGE ACQUISITION METHOD AND TERMINAL", the content of which is hereby incorporated by reference in its entirety.

TECHNICAL FIELD

The present invention relates to the field of terminal shooting, and more particularly, to an image acquisition device, an image acquisition method and an image acquisition terminal, which can enhance image brightness in dark light conditions.

BACKGROUND

Environmental illumination is a physical quantity that is used to reflect light and shade degree of environments in which an object is located, and is equal to the luminous flux through the unit area vertically in numerical. The unit of illumination is the Lux, and 1 Lux is equal to the illumination generated by 1 lumen of luminous flux shining on 1 square meter surface. When the environment illumination is relatively small, such as less than 10 Lux, the environment is regarded as a dark light environment.

When shooting under the dark light environment, due to the lack of the environment illumination, the brightness of shot images may reduce, and the image as a whole is black and blurring. In the existing technology, for improving the brightness of the images shot under the dark light environment, a method of increasing exposure time is usually adopted. However, in the process of shooting, a terminal such as a mobile phone is usually held by the hand in use, and in the process of exposure, the image registration is not executed, which is easy to cause the images blurring in the process of long exposure.

Therefore, how to provide an image acquisition device, an image acquisition method and an image acquisition terminal which can meet the brightness requirement in the dark light condition, is a technical problem to be solved for the persons having ordinary skill in the art.

SUMMARY

To solve the above problems, the present disclosure aims to provide an image acquisition device, an image acquisition method and a terminal, so as to solve the problem of images shot in a dark light environment to be blurring in the existing technology.

In order to achieve the above purpose, the present disclosure provides an image acquisition device, two image acquisition methods and an image acquisition terminal.

The image acquisition device includes a camera shooting module, a control module and a processing module, wherein, the camera shooting module includes at least two cameras;

the control module is configured to control the at least two cameras of the camera shooting module to shoot the same scenario to obtain at least two images; and the processing module is configured to process the at least two images shot by the at least two cameras of the camera shooting module for the same scenario, so as to obtain an image with enhanced brightness.

In this technical solution, the processing module includes a correction unit, a denoising unit and a brightness superposition unit. The correction unit is configured to correct the at least two images shot simultaneously by the at least two cameras for the same scenario according to a distance between the at least two cameras and a location relationship of the at least two cameras. The denoising unit is configured to remove noises in at least two corrected images shot simultaneously by the at least two cameras. The brightness superposition unit is configured to superpose the brightness of corresponding pixel points in the at least two images shot simultaneously by the at least two cameras, so as to obtain an image with enhanced brightness.

In this technical solution, the control module includes a dark light judgment unit and a control unit. The dark light judgment unit is configured to detect the environment illumination while shooting and determine the shooting environment is a dark light environment when the environment illumination is smaller than a preset threshold value. The control unit is configured to control the at least two cameras to shoot the same scenario simultaneously on the basis that the dark light judgment unit determines the shooting environment is the dark light environment.

The control unit is further configured to control the at least two cameras to continuously shoot the same scenario simultaneously to obtain at least two images on the basis that a continuous shooting instruction is received.

In this technical solution, the processing module includes a correction unit, a denoising unit and a brightness superposition unit. The correction unit is configured to correct the at least two images shot simultaneously by the at least two cameras every time. The denoising unit is configured to remove noises in at least two corrected images shot simultaneously by the at least two cameras every time. The brightness superposition unit is configured to superpose the brightness of the pixel points in at least two images shot currently by the at least two cameras with the brightness of corresponding pixel points in the image with enhanced brightness obtained by superposing at least two images shot by the at least two cameras last time, so as to obtain an image with enhanced brightness after multiple shootings.

The image acquisition device further includes a display module. The display module is configured to display the image with enhanced brightness obtained after each shooting.

An image acquisition method applied to the image acquisition device includes:

controlling at least two cameras to shoot the same scenario to obtain at least two images; and processing the at least two images shot by the at least two cameras for the same scenario, so as to obtain an image with enhanced brightness.

The image acquisition method further includes the steps of determining whether a shooting environment is a dark light environment or not and controlling the at least two cameras to shoot the same scenario when the shooting environment is the dark light environment.

An image acquisition method applied to an image acquisition device includes:

controlling at least two cameras to shoot the same scenario to obtain at least two images for the first time;

processing the at least two images shot by the at least two cameras for the same scenario, so as to obtain an image with enhanced brightness; and determining whether a continuous shooting instruction is received or not, and controlling the at least two cameras to shoot continuously to obtain multi-frame images if the continuous shooting instruction is received, and processing the multi-frame images to obtain an image with enhanced brightness, and displaying the image with enhanced brightness.

The image acquisition terminal includes a processor, a memory and a camera shooting module. The camera shooting module includes at least two cameras. The memory stores a group of program codes. The processor is configured to call the program codes stored in the memory to execute for:

controlling at least two cameras to shoot the same scenario to obtain at least two images; and processing the at least two images shot by the at least two cameras for the same scenario, so as to obtain an image with enhanced brightness.

In this technical solution, the processor calling the program codes stored in the memory to execute for processing the at least two images shot by the at least two cameras for the same scenario, so as to obtain an image with enhanced brightness, includes:

correcting the at least two images shot simultaneously by the two cameras for the same scenario according to a distance between the at least two cameras and a location relationship of the at least two cameras; and superposing the brightness of corresponding pixel points in the at least two images shot simultaneously by the at least two cameras, so as to obtain an image with enhanced brightness.

In this technical solution, the processor calling the program codes stored in the memory to execute for controlling at least two cameras to shoot the same scenario to obtain at least two images, includes:

determining whether a shooting environment is a dark light environment or not; and controlling the at least two cameras to shoot the same scenario to obtain at least two images if the shooting environment is the dark light environment.

In this technical solution, the processor calls the program codes stored in the memory to further executes for:

controlling the at least two cameras to continuously shoot the same scenario simultaneously to obtain at least two images on the basis that a continuous shooting instruction is received.

In this technical solution, the processor calling the program codes stored in the memory to execute for processing the at least two images shot by the at least two cameras for the same scenario, so as to obtain an image with enhanced brightness, includes:

correcting the at least two images shot simultaneously by the at least two cameras every time;

removing noises in at least two corrected images shot simultaneously by the at least two cameras every time; and superposing the brightness of the pixel points in images shot currently by the at least two cameras with the brightness of corresponding pixel points in the image with enhanced brightness obtained by superposing at least two images shot by the at least two cameras last time, so as to obtain an image with enhanced brightness after multiple shootings.

In this technical solution, after the step of processing the at least two images shot by the at least two cameras for the same scenario, so as to obtain an image with enhanced brightness, the processor calls the program codes stored in the memory to further executes for:

displaying the image with enhanced brightness obtained after each shooting.

The image acquisition device, the image acquisition methods and the image acquisition terminal provided in the present disclosure employ at least two cameras. When the shooting environment is a dark light environment, the control module can control the at least two cameras to shoot the same scenario simultaneously to obtain at least two images; and the processing module can process the at least two images, so as to obtain an image with enhanced brightness. Therefore, the image acquisition device, the image acquisition methods and the image acquisition terminal provided in the present disclosure can obtain an image with enhanced brightness in a dark light environment. The at least two cameras in the present disclosure can be controlled to shoot the same scenario simultaneously, which can solve the problem of obtained images to be blurring due to increasing exposure time in the existing technology.

DETAILED DESCRIPTION

In order to illustrate the embodiments or existing technical solutions more clearly, a brief description of drawings that assists the description of embodiments of present disclosure or existing art will be provided below. It should be noted that, in the case of no conflict, the embodiments of the present disclosure and the features of each embodiment can be combined mutually. The invention will now be described in detail on the basis of preferred embodiments and drawings. It is to be understood that various changes may be made without departing from the spirit and scope of the disclosure and the embodiments of the present disclosure and features in the embodiments can be combined with each other.

Figure 1:
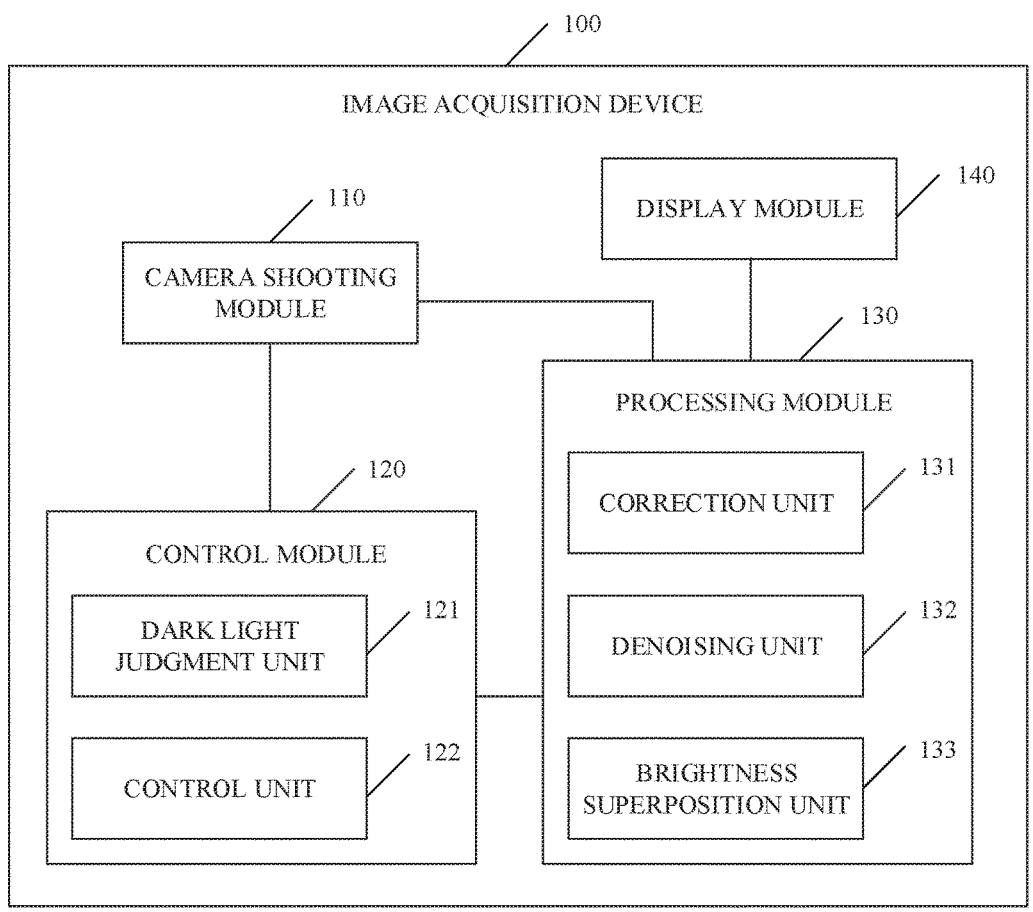
FIG. 1 is a block diagram of an image acquisition device according to an embodiment of the present disclosure.
Figure 2:
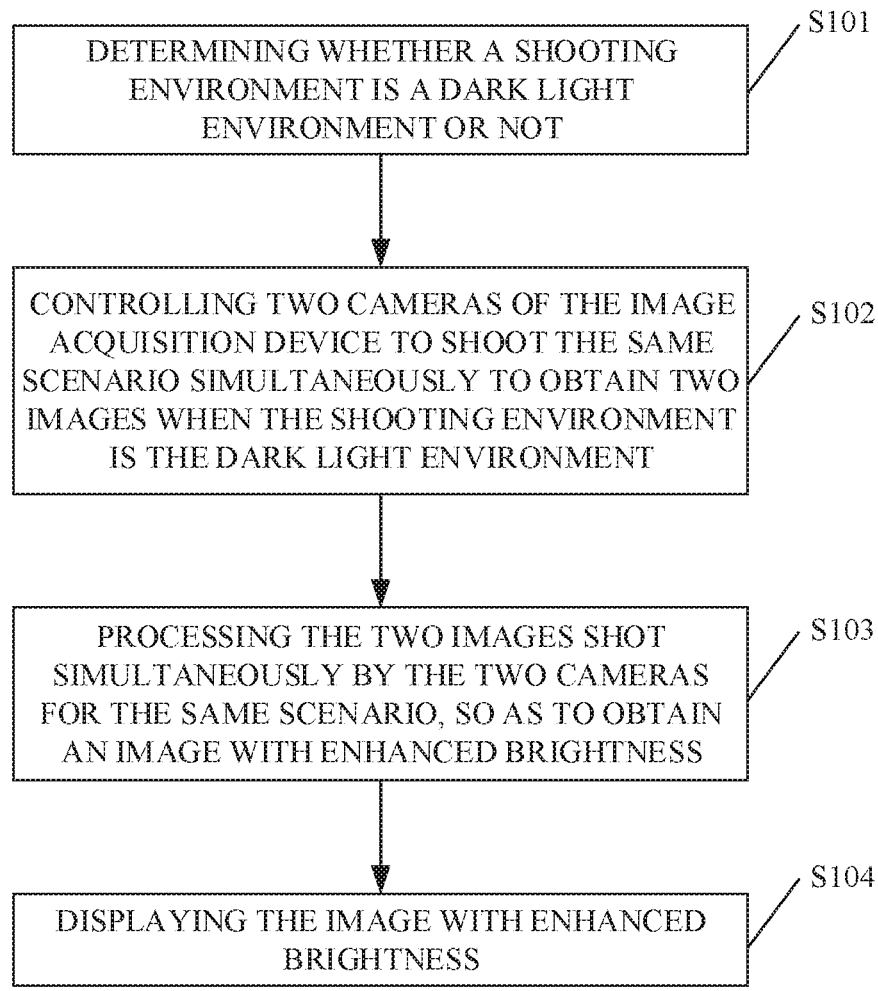
FIG. 2 is a flowchart of an image acquisition method according to an embodiment of the present disclosure.
Figure 3:
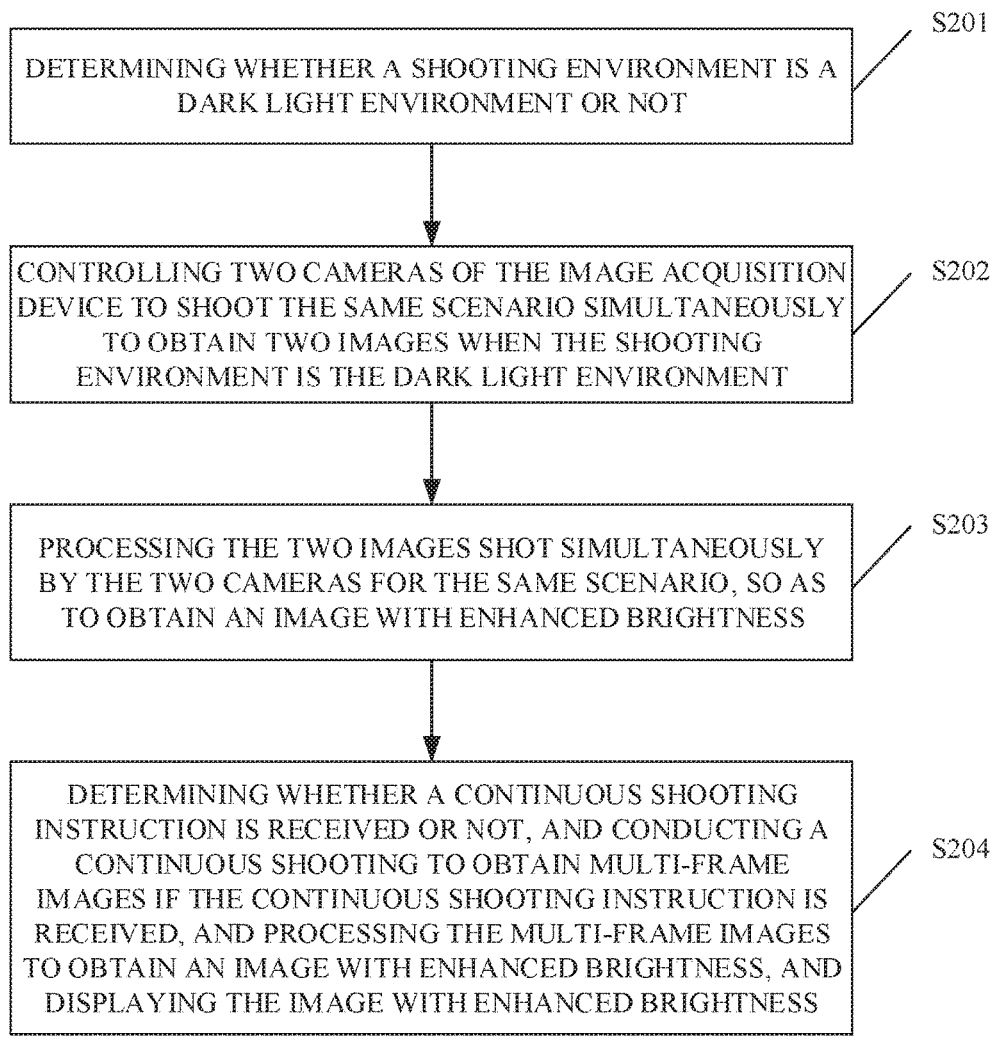
FIG. 3 is a flowchart of an image acquisition method according to another embodiment of the present disclosure.

Referring to FIG. 1, FIG. 1 is a block diagram of an image acquisition device 100 according to an embodiment of the present disclosure. The image acquisition device 100 in this embodiment can be applied to a mobile phone, a table computer, and other intelligent devices. The shooting referred in the present disclosure includes, but not limited to, taking pictures, recording video, and so on. Taking pictures is taken here as an example to describe the present disclosure. It should be understood that a video can be obtained by multiple pictures according to time order, namely, the present disclosure also applies to video shooting.

The image acquisition device 100 includes a camera shooting module 110, a control module 120, a processing module 130 and a display module 140.

The camera shooting module 110 can be a camera shooting module in a mobile phone or other terminals, and it is configured for image sampling (e.g., taking pictures, recording videos) for an external scenario. In this embodiment, the camera shooting module 110 includes at least two cameras.

In this embodiment, the camera shooting module 110 includes two cameras. Preferably, the two cameras have the same resolution. The two cameras are located adjacent to each other. Preferably, in the process of production, the distance of the two cameras should be as short as possible if the condition allows, so that when the two cameras shoot the same scenario, the images shot by the two cameras can be matched as many as possible.

The control module 120 is configured to control the camera shooting module 110 to shoot the scenario. In detail, the control module 120 determines whether a shooting environment is a dark light environment or not, and controls the camera shooting module 110 to shoot. In detail, when the shooting environment is a dark light environment, the control module 120 controls the two cameras of the camera shooting module 110 to shoot the same scenario simultaneously, otherwise, the control module 120 controls one of the two cameras of the camera shooting module 110 to shoot. The control module 120 is also configured to, according to a continuous shooting instruction of a user, control the two cameras to continuously shoot the same scenario simultaneously in the dark light environment, namely, the control module 120 is configured to control each of the two cameras to conduct multiple shootings. In the process of multiple shootings, the control module 120 can control the two cameras to shoot simultaneously for each shooting.

In detail, the control module 120 can include a dark light judgment unit 121 and a control unit 122. The dark light judgment unit 121 is configured to detect the environment illumination while shooting. When the environment illumination is smaller than a preset threshold value, the dark light judgment unit 121 determines the shooting environment is a dark light environment. When the environment illumination is greater than the preset threshold value, the dark judgment unit 121 determines the shooting environment is a normal environment. The control unit 122 is configured to start a dark light shooting mode when the dark light judgment unit 121 determines the shooting environment is the dark light environment, namely, the control unit 122 controls the two cameras to shoot the same scenario simultaneously. When the dark light judgment unit 121 determines the shooting environment is the normal environment, the control unit 122 starts a normal shooting mode, namely, the control unit 122 controls one camera of the two cameras of the camera shooting module 110 to shoot.

The processing module 130 is configured to process images shot by the camera shooting module 110 for the same scenario, so as to obtain an image with enhanced brightness.

In detail, the processing module 130 can include a correction unit 131, a denoising unit 132 and a brightness superposition unit 133.

There is a distance between the two cameras of the camera shooting module 110, so the images shot simultaneously by the two cameras for the same scenario may have deviation. The correction unit 131 is configured to correct the images shot simultaneously by the two cameras for the same scenario according to a distance between the two cameras and a location relationship of the two cameras, so as to make two images coincide. Namely, after correction, the same shooting object is located at the same location in the two images shot by the two cameras, that is, the location of a shooting object in the image shot by one camera of the two cameras is the same as the location of the shooting object in the image shot by another camera of the two cameras.

In detail, in this embodiment, the correction unit 131 corrects images employing the following method: firstly, determining three points A, B and C on the surface which is H1 away from both the two cameras and is perpendicular to the optical axis, and obtaining images shot simultaneously by the two cameras; determining the corresponding imaging points are A0, B0 and C0 respectively in the image shot by one camera of the two cameras; and determining the corresponding imaging points are A1, B1 and C1 respectively in the image shot by another camera of the two cameras. Supposing that the coordinates of pixel points corresponding to A0, B0 and C0 are $(X_{a0}, Y_{a0})$, $(X_{b0}, Y_{b0})$ and $(X_{c0}, Y_{c0})$ respectively, and the coordinates of pixel points corresponding to A1, B1 and C1 are $(X_{a1}, Y_{a1})$, $(X_{b1}, Y_{b1})$ and $(X_{c1}, Y_{c1})$ respectively, there exists the following relations:

$$X_{a1}=m+k_1 X_{a0}+k_2 Y_{a0}$$

$$Y_{a1}=n+k_3 Y_{a0}+k_4 X_{a0}$$

$$X_{b1}=m+k_1 X_{b0}+k_2 Y_{b0}$$

$$Y_{b1}=n+k_3 Y_{b0}+k_4 X_{b0}$$

$$X_{c1}=m+k_1 X_{c0}+k_2 Y_{c0}$$

$$Y_{c1}=n+k_3 Y_{c0}+k_4 X_{c0}$$

After imaging, the coordinates (namely, the location of the points in the image) of the above six pixel points are known, so the values of correction parameters m, n, k1, k2, k3 and k4 can be calculated.

According to the above mentioned method, the correction parameters of different surfaces where the distances between each surface and the cameras are different can be calculated. And the correction parameters corresponding to different surfaces where the distances between each surface and the cameras are different can be stored so as to obtain a corresponding relationship between the correction parameters and the surfaces. Therefore, when the two cameras are employed to shoot simultaneously, the image acquisition device 100 can obtain the pixel point in the image shot by another camera of the two cameras corresponding to a pixel point in the image shot by one camera of the two cameras. By moving one image of the two images shot by the two cameras, the pixel points of the two images can completely correspond, so as to achieve to correct the two images.

The denoising unit 132 is configured to remove noises in two corrected images shot simultaneously by the two cameras. The denoising unit 132 can adopt a denoising method to remove the noise. In this embodiment, the denoising unit 132 adopts the following method to remove the noise: firstly, obtaining the brightness value of each pixel point in the two corrected images shot simultaneously by the two cameras; and setting the corresponding pixel points in the two images shot simultaneously by the two cameras, where the difference of whose brightness value or color value is greater than a preset threshold value, to be the noises; finally, removing the noises in the two images respectively, and generating the brightness and the color of the pixel points located at the noises according to brightness information and the color value of the pixel points around the noises.

The brightness superposition unit 133 is configured to superpose the brightness of corresponding pixel points in the two images shot simultaneously by the two cameras, so as to obtain an image with enhanced brightness.

Understandably, when the two cameras are controlled to conduct multiple continuous shootings, the correction unit 131 corrects the two images shot simultaneously by the two cameras for each shooting. The denoising unit 132 is configured to remove the noises in the two corrected images shot simultaneously by the two cameras for each shooting.

The brightness superposition unit 133 is configured to superpose the brightness of the pixel points in the two images shot currently by the two cameras with the brightness of corresponding pixel points in the image with enhanced brightness obtained by superposing the two images shot by the two cameras last time, so as to obtain an image with enhanced brightness. Namely, after a first shooting, the brightness superposition unit 133 superposes the brightness of corresponding pixel points in the images shot by the two cameras for the first time only, thereby obtaining an image with enhanced brightness after the first shooting. After a second shooting, the brightness superposition unit 133 superposes the brightness of the pixel points in the images shot by the two cameras for the second time with the brightness of corresponding pixel points in the image with enhanced brightness obtained after the first shooting, so as to obtain an image with enhanced brightness after the second shooting. In this way, with the increasing number of continuous shootings, the image brightness of final obtained image is significantly enhanced. The display module 140 is configured to display the image with enhanced brightness processed by the processing module 130. Understandably, when the two cameras conduct multiple continuous shootings, the display module 140 is configured to display the image with enhanced brightness obtained after each shooting, so that a photographer can directly observe the image with enhanced brightness obtained after multiple shootings and processing. When the brightness of an image observed currently by the photographer meets the requirement, the control module 120 can control the two cameras to stop continuous shootings. Understandably, in the case of a normal shooting mode, the display module 140 is further configured to display the images shot by one camera of the two cameras of the camera shooting module 110.

The image acquisition device 100 provided in the technical solution includes two cameras. When the shooting environment is a dark light environment, the control module 120 can control the two cameras to shoot the same scenario simultaneously to obtain two images; and the processing module 130 can process the two images, so as to obtain an image with enhanced brightness. Therefore, the image acquisition device 100 provided in the technical solution can obtain an image with enhanced brightness in a dark light environment. The two cameras provided in the technical solution can be controlled to shoot the same scenario simultaneously, which can solve the problem of obtained images to be blurring due to increasing exposure time in the existing technology.

The present disclosure also provides an image acquisition method, and the image acquisition method can be realized by the image acquisition device 100 provided by the embodiment of the technical solution as shown in FIG. 1. The image acquisition method includes the following steps.

Step S101, determining whether a shooting environment is a dark light environment or not.

In this step, the dark light judgment unit 121 can detect the environment illumination while shooting. When the environment illumination is smaller than a preset threshold value, the dark light judgment unit 121 determines the shooting environment is a dark light environment. When the environment illumination is greater than the preset threshold value, the dark judgment unit 121 determines the shooting environment is a normal environment.

Step S102, controlling two cameras of the image acquisition device to shoot the same scenario simultaneously to obtain two images when the shooting environment is the dark light environment.

When the dark light judgment unit 121 determines the shooting environment is the dark light environment, the control unit 122 starts a dark light shooting mode, namely, the control unit 122 controls the two cameras to shoot the same scenario simultaneously. When the dark light judgment unit 121 determines the shooting environment is the normal environment, the control unit 122 starts a normal shooting mode, namely, the control unit 122 controls one camera of the two cameras to shoot, and the shooting could be stopped after obtaining the shot images.

Step S103, processing the two images shot simultaneously by the two cameras for the same scenario, so as to obtain an image with enhanced brightness.

In detail, the step S103 can include the following steps:

Firstly, the correction unit 131 corrects the two images shot simultaneously by the two cameras for the same scenario. There is a distance between the two cameras of the camera shooting module 110, so the images shot simultaneously by the two cameras for the same scenario may have deviation. According to a distance between the two cameras and a location relationship of the two cameras, the correction unit 131 corrects the images shot simultaneously by the two cameras for the same scenario, so as to make two images coincide. Namely, after correction, the same shooting object is located at the same location in the two images.

Then, the denoising unit 132 removes noises in two corrected images shot simultaneously by the two cameras.

The denoising unit 132 can adopt a denoising method to remove the noise. In this embodiment, the denoising unit 132 adopts the following method to remove the noise: firstly, obtaining the brightness value of each pixel point in the two corrected images shot simultaneously by the two cameras; and setting the corresponding pixel points in the two images shot simultaneously by the two cameras, where the difference of whose brightness value or color value is greater than a preset threshold value, to be the noises; finally, removing the noises in the two images respectively, and generating the brightness and the color of the pixel points located at the noises according to brightness information and the color value of the pixel points around the noises.

Finally, after removing the noises of the images, the brightness superposition unit 133 superposes the brightness of corresponding pixel points in the two images shot simultaneously by the two cameras, so as to obtain an image with enhanced brightness. Namely, the brightness superposition unit 133 superposes the brightness value of the corresponding pixel points in the two images to obtain the brightness value of the pixel points in an image with enhanced brightness, so the brightness value of the pixel points in the image with enhanced brightness is approximately equal to the double of the brightness value of each original image of the two images shot by the two cameras.

Step S104, displaying the image with enhanced brightness.

After the step S104, the image acquisition method can also include a step of storing the image with enhanced brightness.

Understandably, when a photographer can confirm that the shooting environment is a dark light environment or the shooting environment defaults to be a dark light environment, the image acquisition method provided by this embodiment can not include the step of determining whether a shooting environment is a dark light environment or not.

Understandably, in this embodiment, the camera shooting module 110 including two cameras is taken here as an example. When employing more than two cameras, the image acquisition device 100 can also control the more than two cameras to shoot simultaneously, and process the images shot by the more than two cameras, so as to obtain an image with enhanced brightness.

The image acquisition device 100 provided in the technical solution includes two cameras. When the shooting environment is a dark light environment, the control module 120 can control the two cameras to shoot the same scenario simultaneously to obtain two images; and the processing module 130 can process the two images, so as to obtain an image with enhanced brightness. Therefore, the image acquisition device 100 provided in the technical solution can obtain an image with enhanced brightness in a dark light environment. The two cameras provided in the technical solution can be controlled to shoot the same scenario simultaneously, which can solve the problem of obtained images to be blurring due to increasing exposure time in the existing technology.

Another embodiment of the technical solution also provides an image acquisition method, and the image acquisition method can be realized by the image acquisition device 100 provided by the embodiment of the technical solution as shown in FIG. 1. The image acquisition method includes the following steps.

Step S201, determining whether a shooting environment is a dark light environment or not.

In this step, the dark light judgment unit 121 can detect the environment illumination while shooting. When the environment illumination is smaller than a preset threshold value, the dark light judgment unit 121 determines the shooting environment is a dark light environment. When the environment illumination is greater than the preset threshold value, the dark judgment unit 121 determines the shooting environment is a normal environment.

Step S202, controlling two cameras of the image acquisition device to shoot the same scenario simultaneously to obtain two images when the shooting environment is the dark light environment.

When the dark light judgment unit 121 determines the shooting environment is the dark light environment, the control unit 122 starts a dark light shooting mode, namely, the control unit 122 controls the two cameras to shoot the same scenario simultaneously. When the dark light judgment unit 121 determines the shooting environment is the normal environment, the control unit 122 starts a normal shooting mode, namely, the control unit 122 controls one camera of the two cameras to shoot, and the shooting could be stopped after obtaining the shot images.

Step S203, processing the two images shot simultaneously by the two cameras for the same scenario, so as to obtain an image with enhanced brightness.

In detail, the step S203 can include the following steps:

Firstly, the correction unit 131 corrects the two images shot simultaneously by the two cameras for the same scenario. There is a distance between the two cameras of the camera shooting module 110, so the images shot simultaneously by the two cameras for the same scenario may have deviation. According to a distance between the two cameras and a location relationship of the two cameras, the correction unit 131 corrects the images shot simultaneously by the two cameras for the same scenario, so as to make two images coincide. Namely, after correction, the same shooting object is located at the same location in the two images.

Then, the denoising unit 132 removes noises in two corrected images shot simultaneously by the two cameras.

The denoising unit 132 can adopt a denoising method to remove the noise. In this embodiment, the denoising unit 132 adopts the following method to remove the noise: firstly, obtaining the brightness value of each pixel point in the two corrected images shot simultaneously by the two cameras; and setting the corresponding pixel points in the two images shot simultaneously by the two cameras, where the difference of whose brightness value or color value is greater than a preset threshold value, to be the noises; finally, removing the noises in the two images respectively, and generating the brightness and the color of the pixel points located at the noises according to brightness information and the color value of the pixel points around the noises.

Finally, after removing the noises of the images, the brightness superposition unit 133 superposes the brightness of corresponding pixel points in the two images shot simultaneously by the two cameras, so as to obtain an image with enhanced brightness. Namely, the brightness superposition unit 133 superposes the brightness value of the corresponding pixel points in the two images to obtain the brightness value of the pixel points in an image with enhanced brightness, so the brightness value of the pixel points in the image with enhanced brightness is approximately equal to the double of the brightness value of each original image of the two images shot by the two cameras.

The step S203 can also include a step of displaying the image with enhanced brightness after the first shooting.

Step S204, determining whether a continuous shooting instruction is received or not, and conducting a continuous shooting to obtain multi-frame images if the continuous shooting instruction is received, and processing the multi-frame images to obtain an image with enhanced brightness, and displaying the image with enhanced brightness.

In the process of the continuous shooting, the image acquisition device 100 processes two images shot by the two cameras every time, and superposes the two images with the image with enhanced brightness obtained last time, so as to obtain an image with enhanced brightness after each shooting. Furthermore, the image acquisition device 100 displays each image with enhanced brightness obtained after each shooting. When the continuous shooting stops, a final image with enhanced brightness can be obtained after multiple continuous shootings.

When the brightness of the image with enhanced brightness obtained after the first shooting still cannot meet the requirement, a user can take pressing a shooting button continuously as a continuous shooting instruction, and take stopping pressing the shooting button as a continuous shooting stop instruction. In detail, in the process of the continuous shooting, the image acquisition device 100 can employ the following method to obtain an image with enhanced brightness to meet the requirement.

Firstly, the control unit 122 controls the two cameras to shoot the same scenario simultaneously for the second time to obtain two images; then, the correction unit 131 corrects the two images shot for the second time and the denoising unit 132 removes noises in two corrected images; next, the brightness superposition unit 133 superposes the brightness of the pixel points in the two images shot for the second time with the brightness of the pixel points in the image with enhanced brightness obtained after the first shooting, so as to obtain an image with enhanced brightness after the second shooting, and the display module 140 displays the image with enhanced brightness; finally, the image acquisition device 100 performs multiple shootings and image synthesis in the same way as the second shooting, and until the image acquisition device 100 receives a continuous shooting stop instruction, the shooting stops and a final image with enhanced brightness can be obtained after multiple shootings.

If the continuous shooting instruction is not received after obtaining the image with enhanced brightness for the first shooting, the shooting stops.

Understandably, in this embodiment, the camera shooting module 110 including two cameras is taken here as an example. When employing more than two cameras, the image acquisition device 100 can also control the more than two cameras to shoot simultaneously, and process the images shot by the more than two cameras, so as to obtain an image with enhanced brightness.

The image acquisition method provided in the technical solution includes two cameras. When the shooting environment is a dark light environment, the control module 120 can control the two cameras to shoot the same scenario simultaneously to obtain two images; and the processing module 130 can process the two images, so as to obtain an image with enhanced brightness. Therefore, the image acquisition method provided in the technical solution can obtain an image with enhanced brightness in a dark light environment. The two cameras provided in the technical solution can be controlled to shoot the same scenario simultaneously, which can solve the problem of obtained images to be blurring due to increasing exposure time in the existing technology.

Furthermore, in the process of the continuous shooting, the image acquisition device 100 displays each image with enhanced brightness after each shooting, and the photographer can determine whether to stop the continuous shooting or not on the basis whether displayed images meet the requirement or not. Therefore, by means of the image acquisition method provided by the technical solution, the user can determine whether to stop the continuous shooting or not based on observing the image with enhanced brightness obtained in the process of shooting, thus it is controllable for the obtained shot images, which provides a better user experience.

Figure 4:
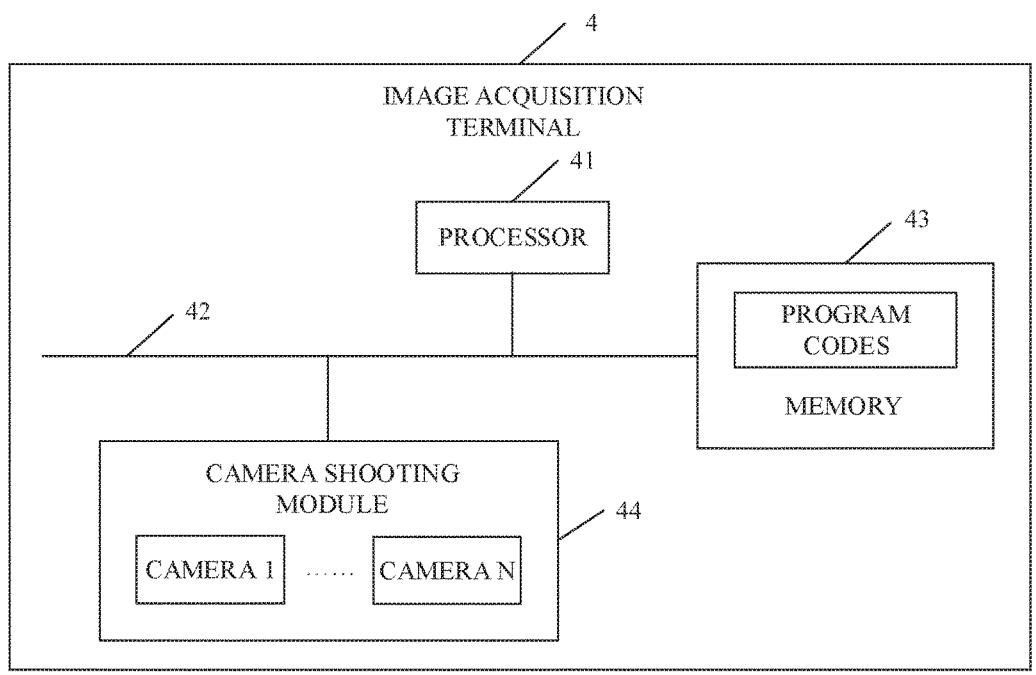
FIG. 4 is a block diagram of an image acquisition terminal according to an embodiment of the present disclosure.

The present disclosure also provides an image acquisition terminal 4, and the image acquisition terminal 4 can be a mobile phone, a table computer, or other electronic devices. Referring to FIG. 4, the image acquisition terminal 4 can include: at least one processor 41, such as a CPU (central processing unit), at least one communication bus 42, a memory 43 and a camera shooting module 44. The communication bus 42 is configured to realize the connections and communications of the at least one processor 41, the memory 43 and the camera shooting module 44; the camera shooting module 44 includes at least two cameras; the memory 43 can be a high speed RAM memory, or a non-volatile memory, such as at least one disk memory. The memory 43 stores a group of program codes, and the processor 41 is configured to call the program code stored in the memory 43 to execute for:

controlling at least two cameras to shoot the same scenario to obtain at least two images; and processing the at least two images shot by the at least two cameras for the same scenario, so as to obtain an image with enhanced brightness.

Wherein, in detail, the processor 41 calling the program codes stored in the memory 43 to execute for processing the at least two images shot by the at least two cameras for the same scenario, so as to obtain an image with enhanced brightness, can include:

correcting the at least two images shot simultaneously by the two cameras for the same scenario according to a distance between the at least two cameras and a location relationship of the at least two cameras; and superposing the brightness of corresponding pixel points in the at least two images shot simultaneously by the at least two cameras, so as to obtain an image with enhanced brightness.

Wherein, in detail, the processor 41 calling the program codes stored in the memory 43 to execute for controlling at least two cameras to shoot the same scenario to obtain at least two images, can include:

determining whether a shooting environment is a dark light environment or not; and controlling the at least two cameras to shoot the same scenario to obtain at least two images if the shooting environment is the dark light environment.

Wherein, the processor 41 calls the program codes stored in the memory 43 to further executes for:

controlling the at least two cameras to continuously shoot the same scenario simultaneously to obtain at least two images on the basis that a continuous shooting instruction is received.

Wherein, in detail, the processor 41 calling the program codes stored in the memory 43 to execute for processing the at least two images shot by the at least two cameras for the same scenario, so as to obtain an image with enhanced brightness, can include:

correcting the at least two images shot simultaneously by the at least two cameras every time;

removing noises in at least two corrected images shot simultaneously by the at least two cameras every time;

superposing the brightness of the pixel points in images shot currently by the at least two cameras with the brightness of corresponding pixel points in the image with enhanced brightness obtained by superposing at least two images shot by the at least two cameras last time, so as to obtain an image with enhanced brightness after multiple shootings.

Wherein, after the step of processing the at least two images shot by the at least two cameras for the same scenario, so as to obtain an image with enhanced brightness, the processor calls the program codes stored in the memory to further executes for:

displaying the image with brightness enhanced obtained after each shooting.

A person having ordinary skills in the art can realize that part or whole of the processes in the methods according to the above embodiments may be implemented by a computer program instructing relevant hardware. The program may be stored in a computer readable storage medium, and execute by at least one processor of the laptop computer, the tablet computer, the smart phone and PDA (personal digital assistant) and other terminal devices. When executed, the program may execute processes in the above-mentioned embodiments of methods. The storage medium may be a magnetic disk, an optical disk, a Read-Only Memory (ROM), a Random Access Memory (RAM), et al. While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention.

What is claimed is:

1. A device for image acquisition, comprising:
at least two cameras;
a processor; and a memory that stores executable instructions, which when executed by the processor, become operational with the processor to:
- determine whether a shooting environment of a scenario is a dark light environment;
- based on a determination that the shooting environment is the dark light environment, control the at least two cameras to simultaneously shoot the scenario to obtain at least two images; and
- based on a determination that a continuous shooting instruction is received, control the at least two cameras to continuously shoot the scenario simultaneously to obtain the at least two images;
- process the at least two images of the scenario shot by the at least two cameras to obtain an image with enhanced brightness,
- wherein the executable instructions to process the at least two images of the scenario shot by the at least two cameras to obtain the image with enhanced brightness comprise executable instructions to:
  - remove noises in a second set of the at least two images shot simultaneously by the at least two cameras; and
  - superpose brightness of pixel points in the second set of the at least two images with brightness of corresponding pixel points in the image with enhanced brightness for a first set of the at least two images simultaneously shot by the at least two cameras to obtain a second image with enhanced brightness after multiple shootings.

2. The device of claim 1, the executable instructions become further operational with the processor to:
correct the at least two images of the scenario shot simultaneously by the at least two cameras according to a distance between the at least two cameras and a location relationship of the at least two cameras.

3. The device of claim 1, wherein the executable instructions to determine whether the shooting environment of the scenario is the dark light environment comprises executable instructions to:
detect environment illumination; and
based on a determination that the environment illumination is less than a preset threshold value, determine the shooting environment is the dark light environment.

4. The device of claim 1, wherein the executable instructions become further operational with the processor to:
correct the at least two images of the scenario shot simultaneously by the at least two cameras for each shooting; and
remove noises in the at least two corrected images of the scenario shot simultaneously by the at least two cameras for each shooting.

5. The device of claim 4, wherein the executable instructions become further operational with the processor to:
display the image with enhanced brightness obtained after each shooting.

6. The device of claim 4, the executable instructions to process the at least two images of the scenario shot by the at least two cameras to obtain the image with enhanced brightness comprises executable instructions to:
superpose brightness of pixel points in at least two images currently shot by the at least two cameras with brightness of corresponding pixel points in a first image with enhanced brightness to obtain a second image with enhanced brightness after multiple shootings, wherein the first image with enhanced brightness was obtained by superposing at least two images previously shot by the at least two cameras.

7. The device of claim 1, wherein the executable instructions become further operational with the processor to:
display the second image with enhanced brightness obtained after each shooting.

8. The device of claim 1, wherein the executable instructions to process the at least two images of the scenario shot by the at least two cameras to obtain the image with enhanced brightness comprises executable instructions to:
superpose brightness of corresponding pixel points in the at least two images shot simultaneously by the at least two cameras to obtain the image with enhanced brightness.

9. A method for image acquisition, comprising:
- based on a determination that a shooting environment is a dark light environment, controlling, by an image acquisition device, at least two cameras to shoot a same scenario to obtain at least two images of the same scenario; and
- based on a determination that a continuous shooting instruction is received, controlling, by the image acquisition device, the at least two cameras to continuously shoot the same scenario simultaneously to obtain the at least two images of the same scenario;
- processing the at least two images of the same scenario simultaneously shot by the at least two cameras to obtain an image with enhanced brightness;
- wherein processing the at least two images includes:
  - removing noises in a second set of the at least two images shot simultaneously by the at least two cameras; and
  - superposing brightness of pixel points in the second set of the at least two images with brightness of corresponding pixel points in the image with enhanced brightness for a first set of the at least two images simultaneously shot by the at least two cameras to obtain a second image with enhanced brightness after multiple shootings.

10. The method of claim 9, wherein the processing the at least two images of the same scenario simultaneously shot by the at least two cameras to obtain the image with enhanced brightness comprises:
correcting the at least two images of the same scenario simultaneously shot by the at least two cameras according to a distance between the at least two cameras and a location relationship of the at least two cameras.

11. The method of claim 10, wherein the processing the at least two images of the same scenario simultaneously shot by the at least two cameras to obtain the image with enhanced brightness comprises:
superposing brightness of corresponding pixel points in the at least two images of the same scenarios simultaneously shot by the at least two cameras to obtain the image with enhanced brightness.

12. The method of claim 9, further comprising:
determining whether a continuous shooting instruction is received;
controlling the at least two cameras to shoot continuously to obtain multi-frame images when the continuous shooting instruction is received;
processing the multi-frame images to obtain an image with enhanced brightness; and
displaying the image with enhanced brightness.

13. The method of claim 12, further comprising:
controlling the at least two cameras to shoot the same scenario simultaneously for a second time to obtain at least two images shot for the second time, wherein shooting for the second time occurs after shooting for a first time;

correcting the at least two images shot for the second time and removing noises in the at least two corrected images shot for the second time;

superposing brightness of pixel points in the at least two corrected images shot for the second time with brightness of pixel points in a first image with enhanced brightness obtained after shooting for the first time to obtain a second image with enhanced brightness after shooting for the second time; and performing multiple shootings and image synthesis in the same way as the second shooting until receiving a continuous shooting stop instruction to obtain a final image with enhanced brightness after multiple shootings.

14. The method of claim 12, further comprising:

based on a determination that the continuous shooting instruction is not received, stopping shooting after obtaining the image with enhanced brightness for a first shooting.

15. A terminal for image acquisition, comprising:

at least two cameras; a processor; and a memory that stores executable instructions, which when executed by the processor, become operational with the processor to:

determine whether a shooting environment of a scenario is a dark light environment;

control, based on a determination that the shooting environment is the dark light environment, the at least two cameras to simultaneously shoot a same scenario to obtain at least two images of the same scenario;

control, based on a determination that a continuous shooting instruction is received, the at least two cameras to continuously shoot the same scenario simultaneously to obtain the at least two images of the same scenario;

superpose brightness of corresponding pixel points in the at least two images of the same scenario simultaneously shot by the at least two cameras to obtain an image with enhanced brightness;

remove noises in a second set of the at least two images shot simultaneously by the at least two cameras; and superpose brightness of pixel points in the second set of the at least two images with brightness of corresponding pixel points in the image with enhanced brightness for a first set of the at least two images simultaneously shot by the at least two cameras to obtain a second image with enhanced brightness after multiple shootings.

16. The terminal of claim 15, wherein the executable instructions become further operational with the processor to:

based on a determination that a continuous shooting instruction is received, control the at least two cameras to continuously shoot the same scenario simultaneously to obtain the at least two images.

17. The terminal of claim 15, where the executable instructions become further operational with the processor to:

display the image with enhanced brightness.

* * * * *